(12) United States Patent
Okazaki

(10) Patent No.: US 7,907,202 B2
(45) Date of Patent: Mar. 15, 2011

(54) IMAGE PICKUP APPARATUS

(75) Inventor: Takashi Okazaki, Hyogo (JP)

(73) Assignee: Sony Corporation, Tokyo (JP)

( * ) Notice: Subject to any disclaimer, the term of this patent is extended or adjusted under 35 U.S.C. 154(b) by 431 days.

(21) Appl. No.: 12/059,381

(22) Filed: Mar. 31, 2008

(65) Prior Publication Data
US 2008/0266439 A1 Oct. 30, 2008

(30) Foreign Application Priority Data
Apr. 26, 2007 (JP) ................. 2007-116618

(51) Int. Cl.
H04N 5/222 (2006.01)
(52) U.S. Cl. .................. 348/333.01; 348/341
(58) Field of Classification Search ........... 348/33.01, 348/333.08, 333.09, 341
See application file for complete search history.

(56) References Cited

U.S. PATENT DOCUMENTS
6,661,460 B1 * 12/2003 Higuchi ............ 348/333.08
6,876,432 B2 * 4/2005 Togashi et al. ............ 352/38
2006/0182433 A1 * 8/2006 Kawahara et al. ........... 396/123
2006/0210265 A1 * 9/2006 Adachi ................ 396/374
2007/0019097 A1 * 1/2007 Fukui ................ 348/333.01

FOREIGN PATENT DOCUMENTS
JP 2005-266991 9/2005

* cited by examiner

Primary Examiner — Gevell Selby
(74) Attorney, Agent, or Firm — Oblon, Spivak, McClelland, Maier & Neustadt, L.L.P.

(57) ABSTRACT

An image pickup apparatus with a specific operation member for accepting an operation input includes a image pickup unit configured to receive a light image of a subject and generate an image signal, a display unit configured to display an image on the basis of the image signal, an electronic finder unit configured to cause the display unit to display the image relating to the light image before performance of a main shooting process on the basis of image signals generated in sequence by the image pickup unit, an optical finder unit configured to guide the light image to a finder window, and an allocation unit configured to allocate a function to the specific operation member in the case in which the optical finder unit is used and another function to the specific operation member in the case in which the electronic finder unit is used.

8 Claims, 6 Drawing Sheets

IMAGE PICKUP APPARATUS

CROSS REFERENCES TO RELATED APPLICATIONS

The present invention contains subject matter related to Japanese Patent Application JP 2007-116618 filed in the Japanese Patent Office on Apr. 26, 2007, the entire contents of which are incorporated herein by reference.

BACKGROUND OF THE INVENTION

1. Field of the Invention

The present invention relates to an image pickup apparatus having a predetermined operation member for accepting an operation input.

2. Description of the Related Art

Some image pickup apparatuses, for example, a digital camera, are capable of allowing allocation of a function to a specific operation member to improve operability.

For example, Japanese Unexamined Patent Application Publication No. 2005-266991 discloses an image pickup apparatus capable of realizing a desired function easily by allowing an operation member (for example, a specific button) to be allocated with a predetermined function which is frequently used by a user and allowing the user to operate the operation member.

SUMMARY OF THE INVENTION

The image pickup apparatus disclosed in Japanese Unexamined Patent Application Publication No. 2005-266991 can only allocate one function to such an operation member. Thus, the operation member is not appropriately and effectively utilized on every occasion. In particular, with respect to digital cameras, the number of functions tends to be increasing; however, the number of operation members capable of being provided on a camera casing is limited. Thus, it is important to utilize such an operation member effectively.

For example, a digital single-lens reflex (SLR) camera is capable of switching between an electronic viewfinder (EVF) with a live view option that displays a live view on, for example, a back-side monitor and an optical viewfinder (OVF). With respect to such a digital SLR camera, if the same operation member can be set to function differently in the case in which the EVF is used from in the case in which the OVF is used, the operation member can be appropriately and effectively utilized.

It is desirable to provide an image pickup apparatus in which an operation member can be effectively utilized.

An image pickup apparatus according to an embodiment of the present invention having a specific operation member for accepting an operation input includes an image pickup unit configured to receive a light image of a subject and generating an image signal, a display unit configured to display an image on the basis of the image signal, an electronic finder unit configured to cause the display unit to display the image relating to the light image of the subject before performance of a main shooting process on the basis of image signals generated in sequence by the image pickup unit, an optical finder unit configured to guide the light image of the subject to a finder window, and an allocation unit configured to allocate a function of the image pickup apparatus to the specific operation member. In the image pickup apparatus, one of the electronic finder unit and the optical finder unit can be selectively used. The allocation unit includes an allocation control section configured to allocate a first function to the specific operation member in the case in which the optical finder unit is used and allocate a second function to the specific operation member in the case in which the electronic finder unit is used. In the image pickup apparatus, the first function is a function which is not used in the case in which the electronic finder unit is used, and the second function is a function which is not used in the case in which the optical finder unit is used.

According to the embodiment of the present invention, while the first function is allocated to the specific member in the case in which the OVF is used (in this case, the light image of the subject is guided to the finder window), the second function is allocated to the specific member in the case in which the EVF is used (in this case, before the main shooting process is performed, the display unit is caused to display the light image of the subject on the basis of the image signals sequentially generated by the image pickup unit). The first function is not used in the case in which the EVF is used, and the second function is not used in the case in which the OVF is used. Thus, the operation member is effectively utilized.

DESCRIPTION OF THE PREFERRED EMBODIMENTS

First Embodiment

Figure 1:
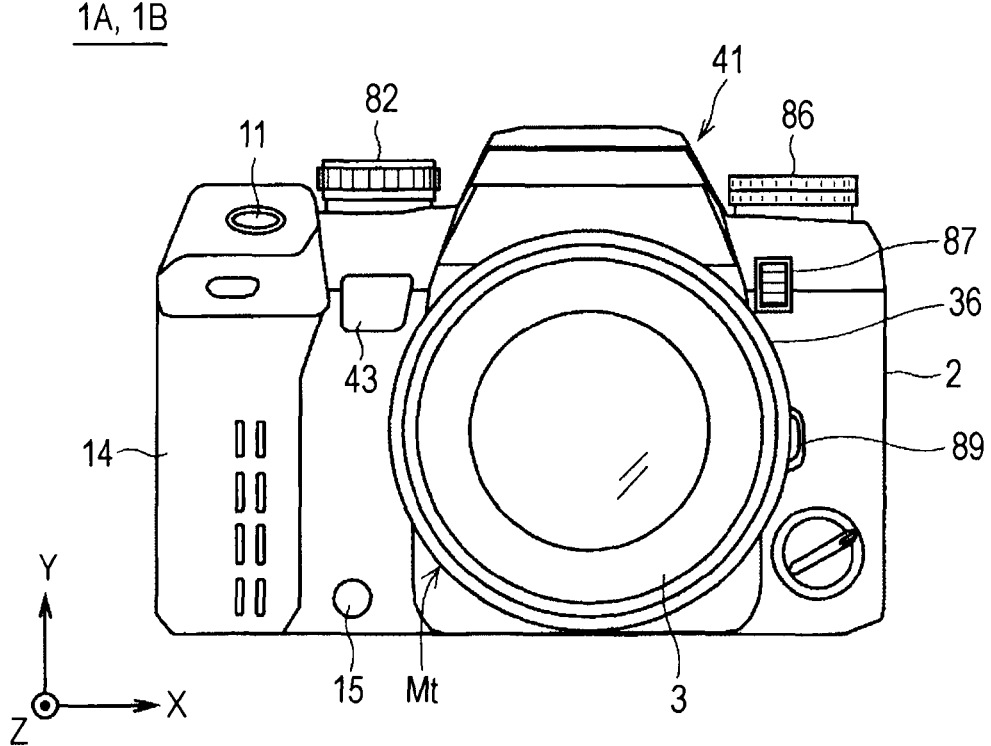
FIG. 1 is a front view showing an exterior of an image pickup apparatus according to a first embodiment of the present invention.
Figure 2:
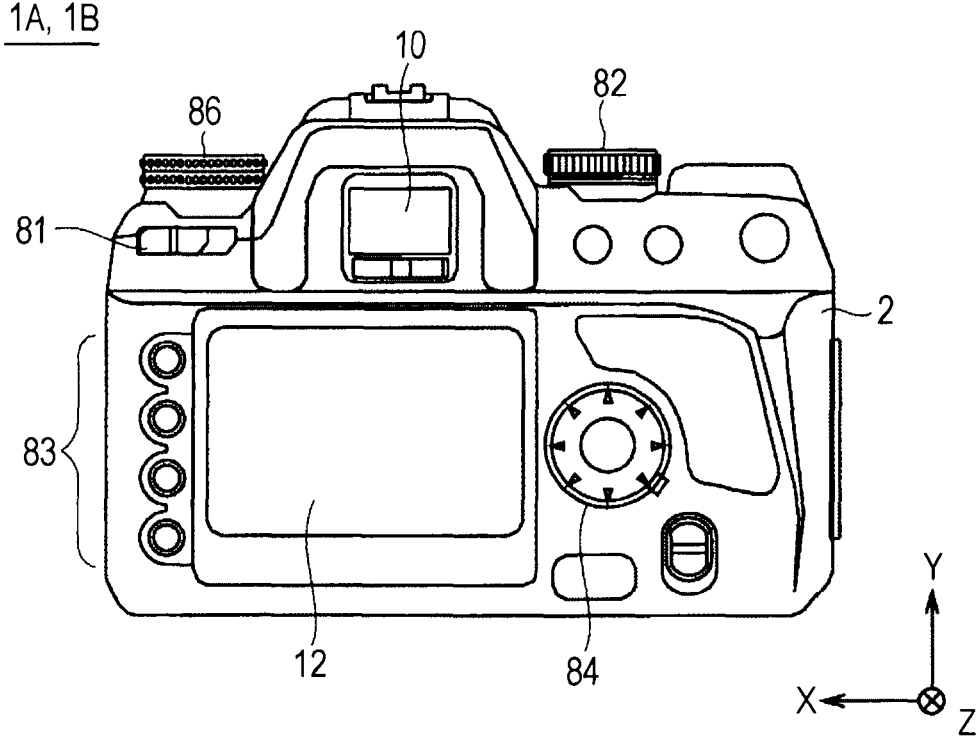
FIG. 2 is a back view showing the exterior of the image pickup apparatus.

FIGS. 1 and 2 are diagrams showing an exterior structure of an image pickup apparatus 1A according to a first embodiment of the present invention. Here, FIG. 1 is a front view showing the exterior structure of the image pickup apparatus 1A. FIG. 2 is a back view showing the exterior structure of the image pickup apparatus 1A. The image pickup apparatus 1A is a digital SLR camera with an interchangeable lens.

As shown in FIG. 1, the image pickup apparatus 1A includes a camera main body (a camera body) 2. An interchangeable lens unit (an interchangeable lens) 3 is detachable from the camera main body 2.

The interchangeable lens unit 3 mainly includes a barrel 36 and a shooting optical system provided inside the barrel 36. The shooting optical system includes, for example, lenses 37 (see FIGS. 3 through 5) and an aperture 16 (see FIG. 3). The lenses 37 include, for example, a focus lens that changes a focus position by moving along an optical axis.

The camera main body 2 includes a circular mount unit Mt to which the interchangeable lens unit 3 is attached and a mount/dismount button 89 for allowing mounting and dismounting the interchangeable lens unit 3. The circular mount unit Mt is provided substantially in the center of the front side of the camera main body 2, and the mount/dismount button 89 is provided near the circular mount unit Mt.

The camera main body 2 also includes a mode setting dial 82 and a control-parameter setting dial 86. The mode setting dial 82 is provided at the left upper part of the camera main body 2 from the viewpoint of the observer, and the control-parameter setting dial 86 is provided at the right upper part of the camera main body 2 from the viewpoint of the observer. The operation of the mode setting dial 82 can perform a setting operation (a switching operation) of various modes for the camera (various shooting modes (for example, a portrait shooting mode, a landscape shooting mode, and a full automatic shooting mode), a play mode for playing a captured image, a communication mode for sending and receiving data to and from an external apparatus, and the like). The operation of the control-parameter setting dial 86 can set a control parameter in the various shooting modes.

The camera main body 2 also includes a grip unit 14 for being held by a photographer. The grip unit 14 is provided at the left end part of the front side of the camera main body 2 from the viewpoint of the observer. A shutter release button 11 for causing exposure to start is provided on the top surface of the grip unit 14 from the viewpoint of the observer. A battery chamber and a card chamber are provided inside the grip unit 14. For example, four AA batteries serving as a power source of the camera are housed in the battery chamber. A memory card 90 (see FIG. 3) for recording image data for a captured image is detachably housed in the card chamber.

The shutter release button 11 is a two-state detection button capable of detecting two states, a half-pressed state (an S1 state) and a fully pressed state (an S2 state). When the shutter release button 11 is half-pressed and is in the S1 state, a preparation operation (for example, a preparation operation including an autofocus (AF) control operation and an autoexposure (AE) control operation) is performed. The preparation operation is performed to obtain a still image, which is going to be recorded, of the subject (an image to be captured in the main shooting process). When the shutter release button 11 is fully pressed and is in the S2 state, a capturing operation of the image to be captured in the main shooting process is performed. The capturing operation is a series of operations including an exposure operation performed on a subject image (a light image of the subject) with an image pickup device 5 (described below) and a predetermined image processing operation performed on the image signal resulting from the exposure operation.

Figure 4:
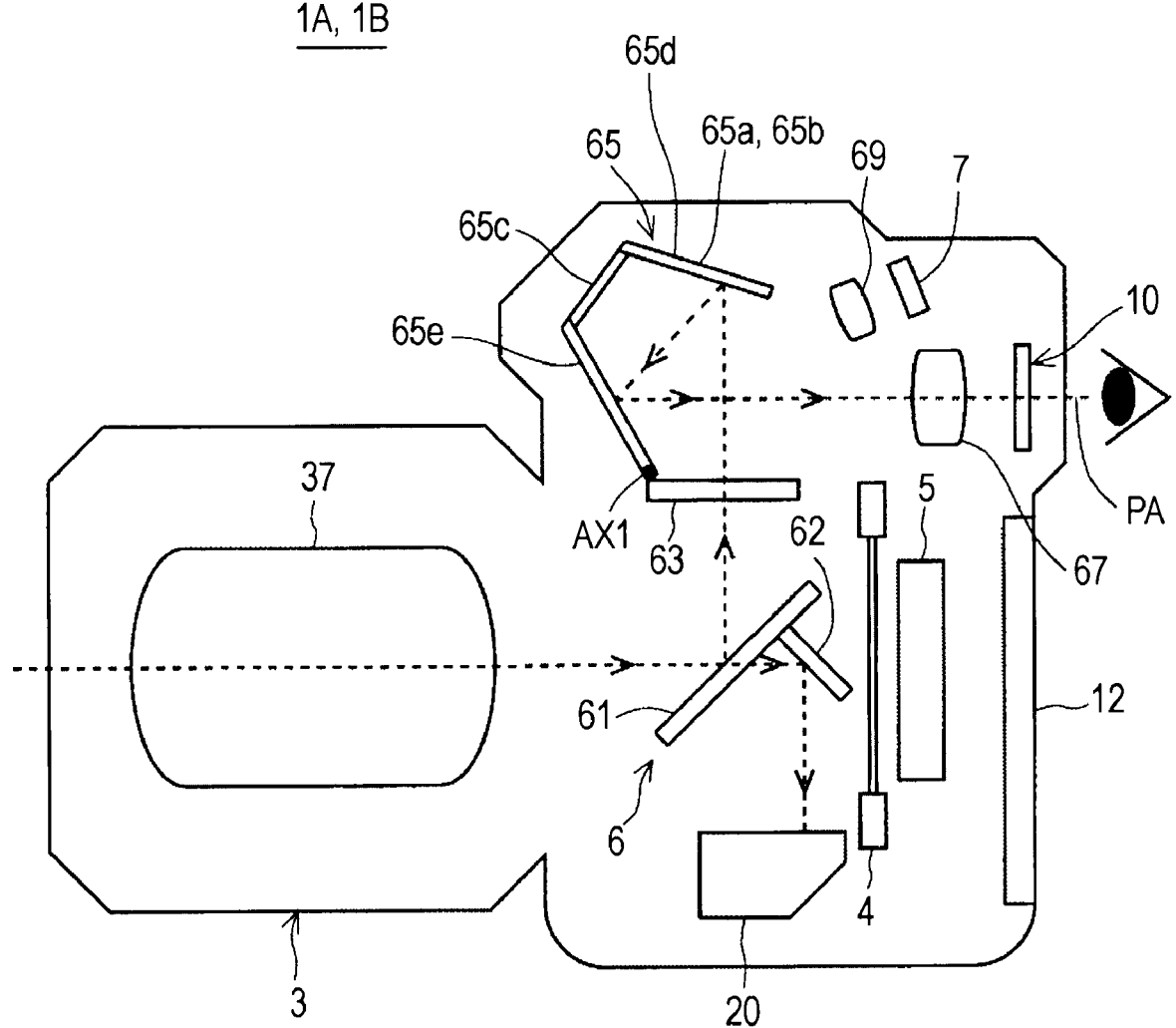
FIG. 4 is a sectional view showing an operation of determining the composition in the case in which an OVF is used.

As shown in FIG. 2, a finder window (a window which an eye approaches) 10 is provided substantially at the upper center part of the back side of the camera main body 2. A photographer can observe the light image of the subject that is optically guided through the interchangeable lens unit 3 as shown in FIG. 4, and determine the composition by looking through the finder window 10. That is, the composition can be determined in the case in which an optical finder is used. In such a case, the light image of the subject is guided through the interchangeable lens unit 3 to the finder window 10.

When the composition is determined in the case in which the optical finder is used, if a preview key 15 is pressed, an image to be captured in the main shooting process can be displayed in the finder window 10 (as specifically described below). The preview key 15 is near a bottom end of the grip unit 14 provided at the left lower part of the front side of the camera main body 2 from the viewpoint of the observer.

In the image pickup apparatus 1A according to the first embodiment, the composition can also be determined by using a live view function in which a live view image (a preview image) of the subject before performance of a main shooting process is displayed on a back-side monitor 12 (as specifically described below). The live view function is a function through which time-series image data of the subject obtained by an image pickup device 7 (see FIG. 3) is sequentially displayed on the back-side monitor 12. In other words, the live view function is a function through which the image data of the subject is displayed on the back-side monitor 12 in a video manner. Rotating of a switching dial 87 performed by a photographer switches between an operation of determining the composition in the case in which the live view function is used and an operation of determining the composition in the case in which the optical finder is used.

As shown in FIG. 2, the back-side monitor 12 whose display screen brightness can be adjusted is provided substantially in the center of the back side of the camera main body 2. The back-side monitor 12 is, for example, a color liquid crystal display (LCD), and capable of switching between an ON state (a display state) and an OFF state (a non-display state). The back-side monitor 12 can display a menu interface for setting, for example, shooting conditions, or display a captured image recorded in the memory card 90 in a playback mode.

A main switch 81 is provided above the top-left corner of the back-side monitor 12. The main switch 81 is a two-position slide switch. If the slide switch is set to the left position "OFF", the power is turned off. If the slide switch is set to the right position "ON", the power is turned on.

A direction selection key 84 is provided to the right of the back-side monitor 12 from the viewpoint of the observer. The direction selection key 84 is a circular operation button. Pressing operations in eight directions to the right, left, up, down, upper right, upper left, lower right, and lower left can each be detected through the direction selection key 84. A pressing operation of a push button provided in the center of the direction selection key 84 can also be detected through the direction selection key 84 in addition to the pressing operations in the eight directions.

Setting buttons 83 for, for example, performing a setting operation through a menu interface or deleting image data are provided to the left of the back-side monitor 12 from the viewpoint of the observer.

Figure 3:
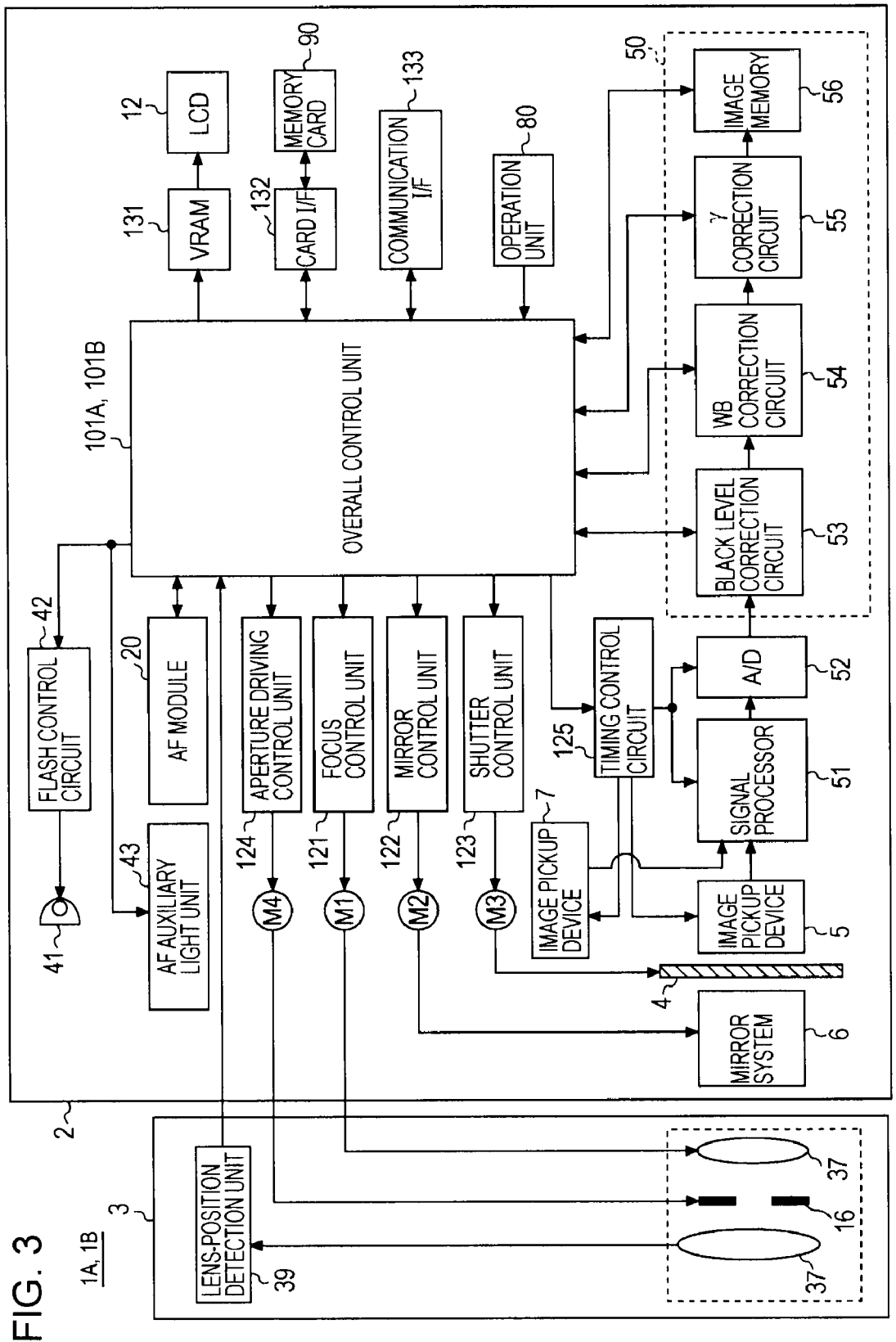
FIG. 3 is a block diagram showing a functional structure of the image pickup apparatus.

An overview of functions of the image pickup apparatus 1A will be described with reference to FIG. 3. FIG. 3 is a block diagram showing the functional structure of the image pickup apparatus 1A.

As shown in FIG. 3, the image pickup apparatus 1A includes, for example, an operation unit 80, an overall control unit 101A, a focus control unit 121, a mirror control unit 122, a shutter control unit 123, an aperture driving control unit 124, a timing control circuit 125, and a digital signal processing circuit 50.

The operation unit 80 includes, for example, buttons, which include the shutter release button 11 (see FIG. 1), and a switch. The overall control unit 101A realizes various operations in response to an operation input performed by a photographer to the operation unit 80.

The overall control unit 101A is a microcomputer, and mainly includes a central processing unit (CPU), a random access memory (RAM), a read-only memory (ROM), and the like. The overall control unit 101A reads a program stored in the ROM, and realizes various functions by executing the program with the CPU. For example, the overall control unit 101A performs a focus control operation for controlling the position of the focus lens in cooperation with an AF module 20, the focus control unit 121, and the like. The AF module 20 can detect an in-focus state of the subject by an in-focus state detection method, for example, a method using a phase difference of light guided from the subject by a mirror system 6.

The focus control unit 121 moves the focus lens included in the lenses 37 of the interchangeable lens unit 3 by generating a control signal on the basis of a signal input from the overall control unit 101A and driving a motor M1. The position of the focus lens is detected by a lens-position detection unit 39 of the interchangeable lens unit 3, and data of the position of the focus lens is sent to the overall control unit 101A. In this way, the focus control unit 121, the overall control unit 101A, and the like control motion of the focus lens along the optical axis.

The mirror control unit 122 controls switching between a state in which the mirror system 6 is positioned away from an optical path (a mirror-up state) and a state in which the mirror system 6 is positioned so as to intercept the optical path (a mirror-down state). The mirror control unit 122 switches between the mirror-up state and the mirror-down state by generating a control signal on the basis of a signal input from the overall control unit 101A and driving a motor M2.

The shutter control unit 123 controls the closing and opening of a shutter 4 by generating a control signal on the basis of a signal input from the overall control unit 101A and driving a motor M3.

The aperture driving control unit 124 controls an aperture diameter of an aperture 16 provided in the interchangeable lens unit 3 by generating a control signal on the basis of a signal input from the overall control unit 101A and driving a motor M4.

The aperture driving control unit 124 (and the overall control unit 101A) reduces the size of the aperture 16 to a size determined by the AE control operation in the main shooting process, and thus an image captured in an appropriate exposure state (and in-focus state) can be obtained. When an optical finder is used before performance of the main shooting process, the light image of the subject (hereinafter referred to as the "subject light image") obtained in a state in which the aperture 16 (see FIG. 3) is basically fully open is guided to the finder window 10; however, if a photographer presses the preview key 15, the subject light image obtained in a state in which the aperture driving control unit 124 (and overall control unit 101A) adjusts the size of the aperture 16 to a size to be set in the main shooting process is guided to the finder window 10. That is, an image to be captured in the main shooting process can be checked in advance through the optical finder by pressing the preview key 15.

The timing control circuit 125 controls, for example, a timing of the image pickup device 5.

The image pickup device 5 (for example, a complementary metal oxide semiconductor (CMOS) sensor) converts the subject light image received via the lenses 37 into an electric signal by the action of optical/electrical conversion, and generates an image signal of the image captured in the main shooting process (an image signal to be recorded). In other words, the image pickup device 5 is used to obtain image data to be recorded.

The image pickup device 5 performs exposure (a charge storage operation performed by the optical/electrical conversion) on the subject light image formed on a light-reception surface in response to a driving control signal (which includes a charge-storage start signal and a charge-storage end signal) input from the timing control circuit 125, and generates an image signal of the subject light image. The image pickup device 5 also outputs the image signal to a signal processor 51 in response to a read control signal input from the timing control circuit 125. A timing signal (a synchronization signal) supplied from the timing control circuit 125 is also input to the signal processor 51 and an analog-to-digital (A/D) converter 52.

The signal processor 51 performs analog signal processing such as automatic gain control (AGC) on the image signal obtained by the image pickup device 5. The resulting image signal is converted into digital image data (image data) by the A/D converter 52. This image data is input to a digital signal processing circuit 50.

The digital signal processing circuit 50 performs digital signal processing on the image data input from the A/D converter 52, and generates image data for the image captured in the main shooting process. The digital signal processing circuit 50 includes a black level correction circuit 53, a white balance (WB) correction circuit 54, a γ correction circuit 55, and an image memory 56.

The black level correction circuit 53 corrects a black level of each piece of pixel data constituting the image data output from the A/D converter 52 to the standard black level. The WB correction circuit 54 adjusts a white balance of the image data supplied from the black level correction circuit 53. The γ correction circuit 55 performs gray scale conversion on the image data supplied from the WB correction circuit 54. The image memory 56 is an image memory used for temporarily storing the image data supplied from the γ correction circuit 55 and capable of being accessed at a high speed. The image memory 56 has a capacity such that a plurality of frames of image data can be stored.

In the main shooting process, after the overall control unit 101A performs appropriate image processing (for example, compression processing) on the image data temporarily stored in the image memory 56, the resulting image data is stored in a memory card 90 via a card interface (I/F) 132.

In addition, the image data temporarily stored in the image memory 56 is appropriately transferred by the overall control unit 101A to a video random access memory (VRAM) 131, and an image based on the image data is displayed on the back-side monitor 12. This enables the image that has just been captured to be displayed for checking (afterview), a stored image to be played back, and the like.

The image pickup apparatus 1A also includes the image pickup device 7 (see FIG. 3) in addition to the image pickup device 5. The image pickup device 7 functions to obtain a so-called live view image (for the EVF).

The image pickup device 7 is structurally similar to the image pickup device 5. With respect to the image pickup device 7, a resolution sufficient for generating an image signal (a video signal) for the live view is necessary. Thus, in general, the image pickup device 7 has a fewer number of pixels than the image pickup device 5.

An image signal obtained by the image pickup device 7 is processed similarly to the image signal obtained by the image pickup device 5. That is, the signal processor 51 performs predetermined processing on the image signal obtained by the image pickup device 7, the A/D converter 52 converts the resulting image signal into digital data, the digital signal processing circuit 50 performs predetermined image processing on the digital data, and then the resulting digital data is stored in the image memory 56.

The time-sequence image data obtained by the image pickup device 7 and stored in the image memory 56 is appropriately transferred by the overall control unit 101A to the VRAM 131 in sequence, and an image based on the time-sequence image data is displayed on the back-side monitor 12. This enables displaying of a video (a live view display) for determining the composition.

Moreover, the image pickup apparatus 1A includes a communication I/F 133, and can perform data communication with an apparatus (for example, a personal computer) connected to the communication I/F 133.

The image pickup apparatus 1A includes a flash 41, a flash control circuit 42, and an AF auxiliary light unit 43. The flash 41 is a light source utilized when, for example, subject brightness is not sufficient. An ON/OFF operation of the flash 41, a flash exposure time, and the like are controlled by the flash control circuit 42, the overall control unit 101A, and the like. The AF auxiliary light unit 43 is an auxiliary light source for AF. An ON/OFF operation of the AF auxiliary light unit 43, an AF-auxiliary-light exposure time, and the like are controlled by, for example, the overall control unit 101A.

Next, a shooting operation, which includes an operation of determining the composition, performed in the image pickup apparatus 1A will be described. As described above, the image pickup apparatus 1A can perform an operation of determining the composition (a framing operation) in the case in which an optical finder (which is also referred to as an OVF) is used and an operation of determining the composition in the case in which an electronic finder (which is also referred to as an EVF) is used. In the case in which the electronic finder is used, a live view image is displayed on the back-side monitor 12.

In the image pickup apparatus 1A, by operating the switching dial 87, a photographer can select the operation of determining the composition in the case in which the OVF is used or the operation of determining the composition in the case in which the EVF is used.

Figure 5:
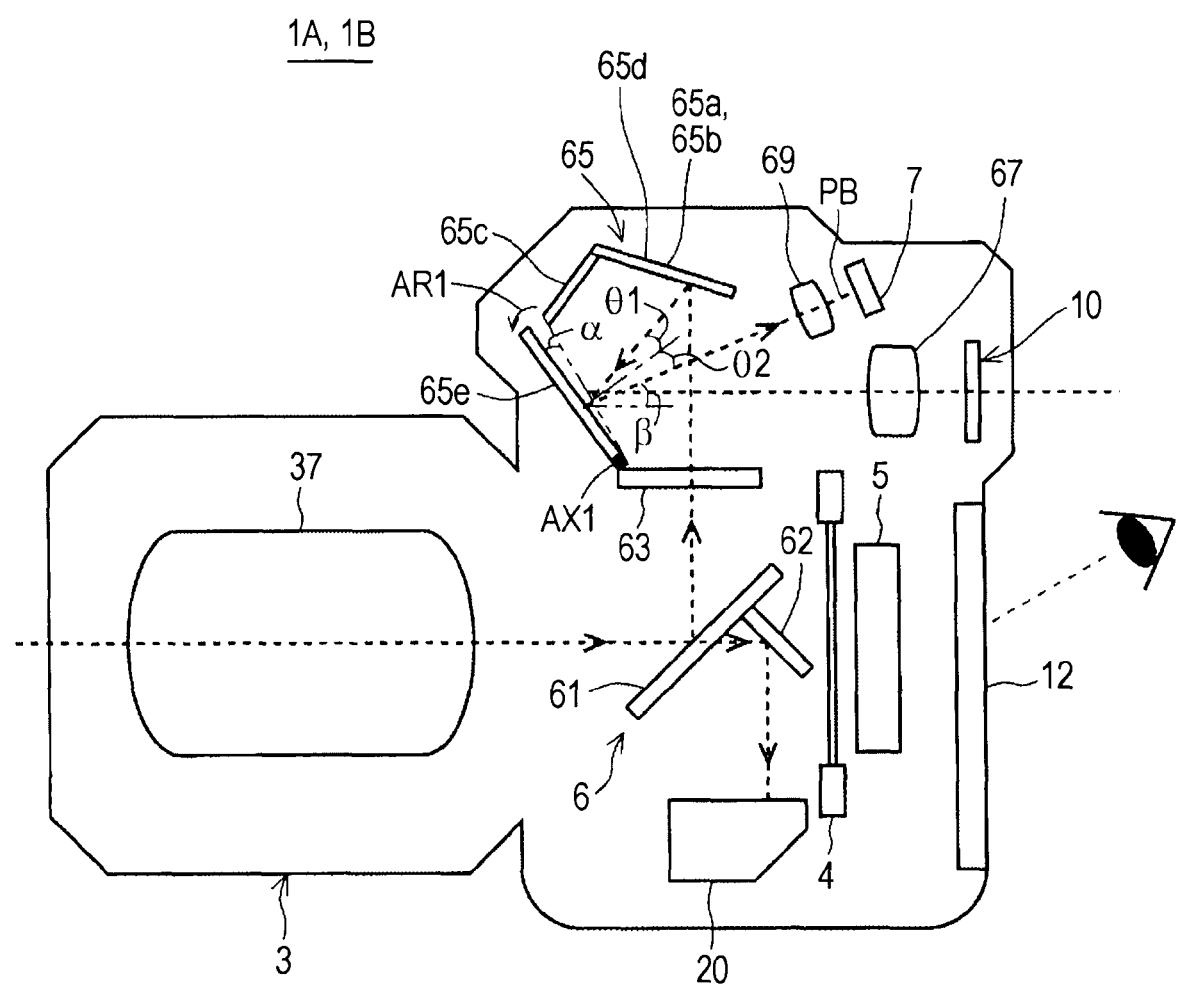
FIG. 5 is a sectional view showing an operation of determining the composition in the case in which an EVF is used.

FIGS. 4 and 5 are sectional views of the image pickup apparatus 1A. FIG. 4 shows the operation of determining the composition in the case in which the OVF is used, and FIG. 5 shows the operation of determining the composition in the case in which the EVF is used.

As shown in FIG. 4 and the like, the mirror system 6 is provided in the optical path (a shooting optical path) extending from the interchangeable lens unit 3 to the image pickup device 5. The mirror system 6 includes a main mirror 61 (a main reflection surface) that reflects light upward from the shooting optical system from the viewpoint of the observer. A part of or the entirety of the main mirror 61 is, for example, a half mirror, and allows part of the light sent from the shooting optical system to pass therethrough. The mirror system 6 also includes a sub-mirror 62 (a sub-reflection surface) that reflects light passing through the main mirror 61 downward from the viewpoint of the observer. The light reflected downward by the sub-mirror 62 is guided so as to enter the AF module 20, and utilized in an AF operation using a phase difference method.

In a shooting mode, until the time when the shutter release button 11 is fully pressed to be in the S2 state (in other words, when the composition is determined), the mirror system 6 is arranged to be in the mirror-down state (see FIGS. 4 and 5). Here, the subject light image supplied from the interchangeable lens unit 3 is reflected upward by the main mirror 61 and enters a pentamirror 65 as a pencil of light to be observed. The pentamirror 65 has a plurality of mirrors (reflection surfaces), and adjusts the orientation of the subject light image. A path along which the pencil of light propagates after entering the pentamirror 65 depends on the mode (that is, the case in which the OVF is used or the case in which the EVF is used) selected for determining the composition. This will be described later. An operator can determine the composition in a desired manner by making the selection.

If the shutter release button 11 is fully pressed to be in the S2 state, the mirror system 6 is driven to be in the mirror-up state and an exposure operation starts. An operation for obtaining a subject still image to be recorded (in other words, an image captured in the main shooting process) is the exposure operation, and is common to the composition determination performed in both cases (that is, the case in which the OVF is used and the case in which the EVF is used).

Next, an operation of determining the composition will be described for each of the cases.

First, an operation of determining the composition in the case in which the OVF is used will be described.

As shown in FIG. 4, if the main mirror 61 and sub-mirror 62 of the mirror system 6 are disposed in the optical path for the subject light image supplied from the interchangeable lens unit 3, the subject light image is guided to the finder window 10 via the main mirror 61, the pentamirror 65, and a camera eyepiece 67. In this way, a finder optical system including the main mirror 61, the pentamirror 65, and the camera eyepiece 67 can guide the pencil of light to be observed, which is the pencil of light supplied from the shooting optical system and reflected by the main mirror 61, to the finder window 10.

More specifically, the light supplied from the interchangeable lens unit 3 is reflected by the main mirror 61, has its propagation path changed in an upward direction, forms an image on a reticle 63, and passes through the reticle 63. The light that has passed through the reticle 63 further has its propagation path changed by the pentamirror 65 and heads for the finder window 10 via the camera eyepiece 67 (see an optical path PA shown in FIG. 4). In this way, the subject light image passing through the finder window 10 reaches a photographer's (observer's) eye and is observed. That is, the photographer can check the subject light image by looking through the finder window 10.

The pentamirror 65 includes two mirrors (Dach mirrors) 65a and 65b formed in a delta-roof shape, a surface 65c fixed to the Dach mirrors (Dach surfaces) 65a and 65b, and a mirror (a reflective surface) 65e. The two mirrors 65a and 65b formed in a delta-roof shape are provided integrally as an integral component 65d by plastics molding. The light reflected by the main mirror 61 and whose propagation path is changed upward is reflected by the Dach mirrors 65a and 65b, and thus horizontally inverted. The horizontally inverted light is further reflected by the mirror 65e and vertically inverted, and then reaches the photographer's eye. In this way, the light image horizontally and vertically inverted in the interchangeable lens unit 3 is further inverted horizontally and vertically by the pentamirror 65. Thus, the photographer can observe the subject image through the OVF with the same horizontal and vertical orientations as the actual subject.

The light passing through the main mirror 61 is reflected by the sub-mirror 62, has its propagation path changed downward, and enters the AF module 20. The AF module 20, the focus control unit 121, and the like realize such an AF operation by using the light entering via the main mirror 61 and sub-mirror 62.

Next, an operation of determining the composition in the case in which the EVF is used will be described.

Similarly to the above-described case, as shown in FIG. 5, the main mirror 61 and sub-mirror 62 of the mirror system 6 are disposed in the optical path for the subject light image supplied from the interchangeable lens unit 3. The light supplied from the interchangeable lens unit 3 is reflected by the main mirror 61, has its propagation path changed upward, forms an image on the reticle 63, and passes through the reticle 63.

In this operation of determining the composition in the case in which the EVF is used, after the light that has passed through the reticle 63 further has its propagation path changed by the pentamirror 65, the light passes through an imaging lens 69 (an imaging optical system) and forms an image again on the imaging area of the image pickup device 7 (see an optical path PB shown in FIG. 5). The light reflected by the main mirror 61 and whose propagation path is changed upward is reflected by the Dach mirrors 65*a* and 65*b*, and thus horizontally inverted. The horizontally inverted light is further reflected by the mirror 65*e*, and thus vertically inverted. The horizontally and vertically inverted image is further inverted by the imaging lens 69 horizontally and vertically. Then, the resulting light reaches the image pickup device 7.

More specifically, compared with the case shown in FIG. 4, the angle of the mirror 65*e* (the mounting angle in the camera main body 2) is changed in the case shown in FIG. 5. To be more specific, from the state shown in FIG. 4, the mirror 65*e* rotates about an axis AX1 positioned at the lower end thereof through a predetermined angle α in a direction indicated by an arrow AR1. The mirror 65*e* can be driven to rotate about the axis AX1 in synchronization with a rotation operation of the switching dial 87. The overall control unit 101A determines whether the operation of determining the composition in the case in which the OVF is used or the operation of determining the composition in the case in which the EVF is used should be performed, in response to a detection result supplied from an angular detector (not shown) that detects an angle of the mirror 65*e* to the axis AX1. To be more specific, in the case of the angle of the mirror 65*e* shown in FIG. 4, the overall control unit 101A determines that the operation of determining the composition in the case in which the OVF is used should be performed, and performs certain processing in which, for example, power supply to the image pickup device 7 is stopped and nothing is displayed on the back-side monitor 12. On the other hand, in the case of the angle of the mirror 65*e* shown in FIG. 5, the overall control unit 101A determines that the operation of determining the composition in the case in which the EVF is used should be performed, and performs live-view mode processing, that is, processing in which power is supplied to the image pickup device 7 and a live view image is displayed on the back-side monitor 12.

As described above, by changing the orientation of the mirror 65*e*, the reflection angle of the light reflected by the mirror 65*e* (the pencil of light to be observed) is changed, and the propagation path for the light reflected by the mirror 65*e* is changed. More specifically, compared with the state shown in FIG. 4, an incidence angle θ1 to the mirror 65*e* becomes relatively small, and a reflection angle θ2 also becomes relatively small (see FIG. 5). As a result, the light reflected by the mirror 65*e* has its optical path changed in an upward direction from the optical path heading for the camera eyepiece 67 to an optical path closer to the Dach mirrors 65*a* and 65*b*, and passes through the imaging lens 69 to reach the image pickup device 7. The imaging lens 69 and the image pickup device 7 are disposed above the camera eyepiece 67, and at a certain position so as not to intercept the pencil of light propagating to the camera eyepiece 67 from the mirror 65*e* in the case in which the OVF is used.

In response to an angle change α of the mirror 65*e*, the propagation path for the pencil of light reflected by the mirror 65*e* is changed to be at an angle β (=2×α), which is twice as large as the angle α. Conversely, in order to change an angle of the optical path for the reflected light by the angle β, it is necessary that the mirror 65*e* rotate only through the angle α, which is half the angle β. That is, a relatively small rotation angle of the mirror 65*e* can relatively largely change the propagation path of the light reflected by the mirror 65*e*. Moreover, although the mirror 65*e* and the image pickup device 7 are disposed relatively far apart from each other, with only a small change in the rotation angle of the mirror 65*e*, the light reflected by the mirror 65*e* can be assuredly guided to the camera eyepiece 67 or the image pickup device 7 that are disposed apart from each other. That is, only a small change in the rotation angle of the mirror 65*e* can cause the pencil of light reflected by the mirror 65*e* to be favorably propagated along one of the two optical paths selectively. Thus, an increase in space due to the rotation of the mirror 65*e* can be minimized.

The image pickup device 7 generates a live view image on the basis of the subject light image that is reflected by the mirror 65*e*, passes through the imaging lens 69, and reaches the image pickup device 7. More specifically, the image pickup device 7 generates a plurality of live view images in sequence at intervals of a very short time (for example, 1/60 sec). The resulting time-sequence images are sequentially displayed on the back-side monitor 12. This allows a photographer to observe a video (live view images) displayed on the back-side monitor 12 and decide the composition by using the video.

In this case, too, similarly to the operation of determining the composition in the case in which the OVF is used (see FIG. 4), an AF operation is realized by using the light having entered the AF module 20 via the main mirror 61 and submirror 62.

Before performance of the main shooting process, the OVF and the EVF can be switched between in the operation of determining the composition in the image pickup apparatus 1A. In the following, a function allocated to the preview key 15 will be described for each of the case in which the OVF is used and the case in which the EVF is used.

In the case in which the OVF is used, the size of the aperture 16 is reduced to the size set for the main shooting process in response to the pressing of the preview key 15 as described above. This causes the subject light image to be in a state of a subject light image that will be captured by the image pickup device 5 in the main shooting process, and the subject light image that will be captured by the image pickup device 5 in the main shooting process is guided to the finder window 10; therefore, a photographer can observe the image to be captured in the main shooting process.

In the case in which the EVF is used (the live view mode), although the size of the aperture 16 is reduced to the size set for the main shooting process, significant effects do not occur compared with the case in which the OVF is used. This is because even if reduction in size of the aperture 16 changes an amount of light received by the image pickup device 7 for the live view, the change is absorbed by an image correction function (for example, gain is increased on the basis of a detected value of light obtained from the image signal generated by the image pickup device 7) performed by, for example, the signal processor 51; therefore, the live view image displayed on the back-side monitor 12 changes little. In the live view mode, although the aperture 16 is set to be fully open, when the image output from the image pickup device 7 for the live view is (almost) overexposed, the signal processor 51 and the like reduce the gain, and thus the live view is appropriately displayed on the back-side monitor 12.

As described above, in the case in which the EVF is used, the function of reducing the size of the aperture 16 is not allocated to the preview key 15 whose original function is reducing the size of the aperture 16. Instead, an auto brightness-monitoring function that is not necessary in the operation of determining the composition in the case in which the OVF is used is allocated to the preview key 15. This auto brightness-monitoring function enables, in the case of low ambient light, the brightness of the back-side monitor 12 to automatically increase in order to brighten the live view image and improve viewability of the back-side monitor 12.

As described above, in the case in which the OVF is used, the image pickup apparatus 1A allows allocation of the function of reducing the size of the aperture 16 to the preview key 15 (the function is a function of the image pickup apparatus 1A and is not used in the case in which the EVF is used). In the case in which the EVF is used, the image pickup apparatus 1A allows allocation of the auto brightness-monitoring function to the preview key 15 (the function is a function of the image pickup apparatus 1A and is not used in the case in which the OVF is used). Therefore, the preview key 15 is effectively utilized.

The preview key 15 is provided at the left lower position of the front side of the image pickup apparatus 1A from the viewpoint of the observer as shown in FIG. 1. In the case of a shooting process performed with the image pickup apparatus 1A set in the standard orientation (set horizontally) when a photographer holds the grip unit 14 with his/her right hand, the preview key 15 is provided within a range that the right little finger (or the right ring finger) can operate the preview key 15 by moving joints (at least one of the first, second, and third joints) of the right little finger (or right ring finger) while the state in which the image pickup apparatus 1A is held with the right fingers except the little finger (or the ring finger) is substantially maintained.

As described above, in the image pickup apparatus 1A, two functions (the function of reducing the size of the aperture 16 and the auto brightness-monitoring function) are set to the preview key 15 with high operability, and the preview key 15 is provided within the range that one of the right fingers holding the image pickup apparatus 1A can reach. This realizes high operability for users.

The specific operation of the image pickup apparatus 1A with the above-described structure will be described.

Figure 6:
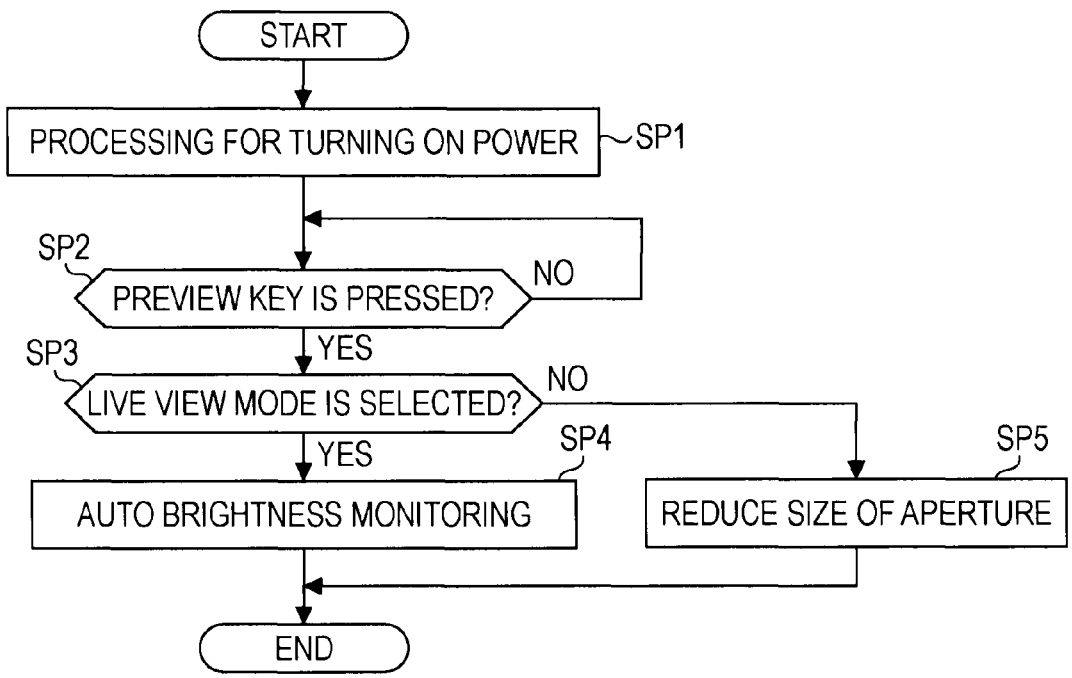
FIG. 6 is a flowchart showing a basic operation of the image pickup apparatus.

FIG. 6 is a flowchart showing a basic operation of the image pickup apparatus 1A. The basic operation is executed by the overall control unit 101A of the image pickup apparatus 1A.

First, when a user operates the main switch 81 to turn on the image pickup apparatus 1A, processing for starting the image pickup apparatus 1A (initialization processing) is performed (step SP1).

In step SP2, it is determined whether the preview key 15 for accepting a photographer's operation input is pressed or not. If it is determined that the preview key 15 is pressed, the flow goes to step SP3. Otherwise, step SP2 is repeatedly executed.

In step SP3, it is determined whether the live view mode in which the EVF is used is selected or not. More specifically, it is determined whether the mirror 65e is in the state (orientation) shown in FIG. 5 or not due to the operation of the switching dial 87. If it is determined that the live view mode is selected, the flow goes to step SP4. If the live view mode is not selected and the OVF is used, the flow goes to step SP5.

In step SP4, the above-described auto brightness-monitoring function is operated. That is, ambient light (light environment) around the display screen of the back-side monitor 12 is detected by a sensor (not shown) or the like, and the brightness of the display screen is adjusted in response to the detected ambient light. In the case of low ambient light, viewability can be improved by brightening the live view image displayed on the back-side monitor 12.

In step SP5, the above-described function of reducing the size of the aperture 16 is operated. This allows observing the image to be captured in the main shooting process through the OVF in advance.

The above-described operations performed in the image pickup apparatus 1A allow allocation of the function of reducing the size of the aperture 16 to the preview key 15 in the case in which the OVF is used and allocation of the auto brightness-monitoring function to the preview key 15 in the case in which the EVF is used; therefore, the preview key 15 (an operation member) is effectively utilized.

Second Embodiment

An image pickup apparatus 1B according to a second embodiment of the present invention is structurally similar to the image pickup apparatus 1A, as shown in FIGS. 1 through 3, according to the first embodiment of the present invention. However, an overall control unit 101B is structurally different from the overall control unit 101A.

More particularly, dissimilar to the first embodiment, the image pickup apparatus 1B can perform an operation of customized allocation of a function to the preview key 15 to be used in the case in which the EVF is used, and a program for performing this operation of the customized allocation is stored in a ROM of the overall control unit 101B. In the following, an operation of the image pickup apparatus 1B will be described in detail with respect to the customized allocation of a function to the preview key 15.

Figure 7:
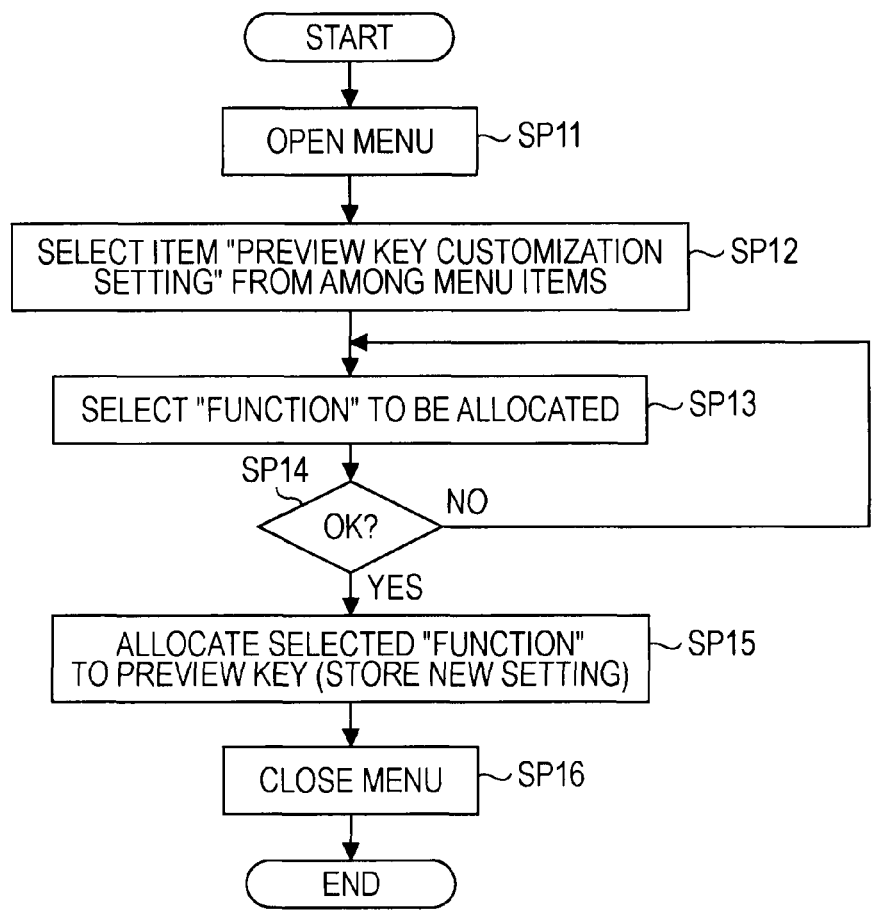
FIG. 7 is a flowchart showing an operation of performing customized allocation of a function to a preview key in an image pickup apparatus according to a second embodiment of the present invention.
Figure 8:
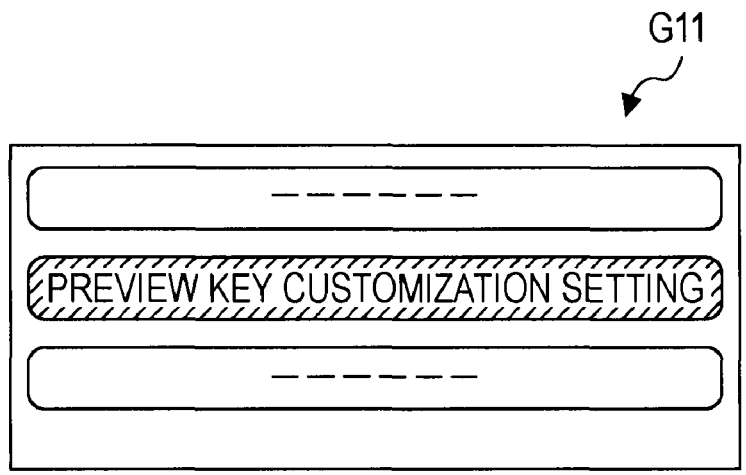
FIG. 8 is a diagram showing a user interface displayed on a back-side monitor.
Figure 9:
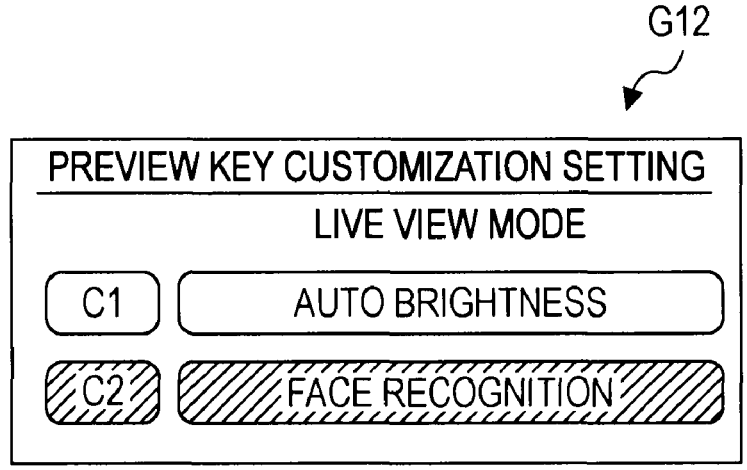
FIG. 9 is a diagram showing another user interface displayed on the back-side monitor.
Figure 10:
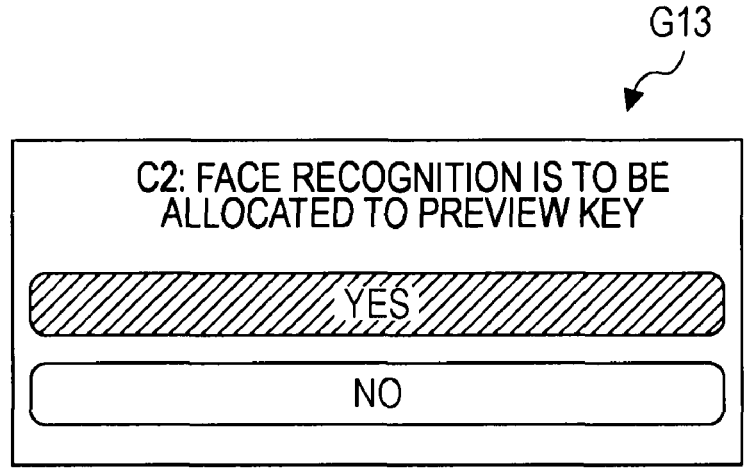
FIG. 10 is a diagram showing another user interface displayed on the back-side monitor.

FIG. 7 is a flowchart showing an operation of the customized allocation of a function to the preview key 15. FIGS. 8 through 10 are diagrams showing interfaces G11 through G13, respectively, displayed on the back-side monitor 12. The operation of the customized allocation will be described with reference to these drawings.

First, a user such as a photographer operates the setting buttons 83, and this causes a menu interface G11 (FIG. 8) to be displayed on the back-side monitor 12 (step SP11).

Afterwards, if the user selects a desired choice "Preview Key Customization Setting" from among a plurality of choices (menu items) (step SP12), the image pickup apparatus 1B determines that an instruction for performing "Preview Key Customization Setting" has been input and an interface G12 is displayed on the back-side monitor 12 (FIG. 9).

Next, the user selects a function to be allocated to the preview key 15 by using the direction selection key 84 from among choices (for example, "Auto Brightness" and "Face Recognition") displayed on the interface G12 (step SP13). Here, "Auto Brightness" shown in FIG. 9 indicates the above-described auto brightness-monitoring function. "Face Recognition" shown in FIG. 9 indicates a face-recognition function of focusing upon a face portion by superimposing and displaying a mark (for example, a frame mark corresponding to the face portion) on the live view image on the back-side monitor 12. The mark indicates a human face detected by analyzing image data obtained by the image pickup device 7.

In response to the selection operation performed in step SP13, the image pickup apparatus 1B specifies a function serving as an allocation object and selected by the user, and displays an interface G13 for confirming the selection (FIG. 10) (step SP14). In the interface G13 shown in FIG. 10, a certain message "Face Recognition Is To Be Allocated To Preview Key" is displayed to confirm whether such an operation should be performed or not.

If the user inputs an instruction indicating that the operation should not be performed, the flow goes back to step SP13 and the operation for selecting a function to be allocated to the preview key 15 is performed again. If the user inputs an instruction indicating that the operation should be performed, the flow goes to step SP15.

In step SP15, the image pickup apparatus 1B stores a new setting such that the function selected in the step SP13 is allocated to the preview key 15. More specifically, the setting stored in a non-volatile memory (for example, a flash ROM) of the overall control unit 101B is overwritten with the new setting so as to be updated. Afterwards, the image pickup apparatus 1B finishes the operation of "Preview Key Customization Setting", and the back-side monitor 12 returns to a state that was displayed before the menu interface was displayed (step SP16).

By performing the above-described operations, the customized allocation of a function to the preview key 15 is performed in the image pickup apparatus 1B. The image pickup apparatus 1B performs operations similar to those performed in the image pickup apparatus 1A as shown in the flowchart of FIG. 6; however, step SP4 (FIG. 6) corresponding to the operation performed when the preview key 15 is pressed in the live view mode is not performed by the image pickup apparatus 1B. That is, the operation performed in step SP4 is fixed as the operation of the auto brightness-monitoring function in the image pickup apparatus 1A, but the image pickup apparatus 1B can perform the operation corresponding to the function selected by the user in "Preview Key Customization Setting". For example, if the above-described face recognition function is set as the function allocated to the preview key 15, the operation of the face recognition function in the live view mode is started in response to the pressing operation of the preview key 15. This causes a face portion detected by the face recognition operation to be expressly displayed on the back-side monitor 12, and an in-focus operation for the face portion to be performed.

The above-described image pickup apparatus 1B has similar advantages to the image pickup apparatus 1A described in the first embodiment. In addition, since the image pickup apparatus 1B can perform customized allocation of a function to the preview key 15 in the live view mode (in the case in which the EVF is used), the preview key 15 (an operation member) is further effectively utilized. Thus, the convenience of operation for users is improved.

Note that the image pickup apparatus 1B may be capable of performing an operation of customized allocation of a function to the preview key 15 not only in the case in which the EVF is used but also in the case in which the OVF is used.

In the above-described embodiments, a certain function allocated to an operation member in the case in which the EVF is used is different from a certain function allocated to the operation member in the case in which the OVF is used, and the preview key 15 is employed as the operation member. However, the preview key 15 does not have to be the operation member on every occasion, and another operation member provided on the housing of the image pickup apparatus 1A may be employed as the above-described operation member.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus including a specific operation member for accepting an operation input, the image pickup apparatus comprising:
a shooting optical system including an aperture;
aperture adjustment means for adjusting a size of the aperture;
image pickup means for receiving a light image of a subject through the aperture and generating an image signal;
display means for displaying an image on the basis of the image signal;
brightness adjustment means for adjusting a display screen brightness of the display means;
electronic finder means for causing the display means to display the image relating to the light image of the subject before performance of a main shooting process on the basis of image signals generated in sequence by the image pickup means;
optical finder means for guiding the light image of the subject to a finder window; and
allocation means for allocating a function of the image pickup apparatus to the specific operation member, wherein
one of the electronic finder means and the optical finder means can be selectively used, and
the allocation means includes
allocation control means for allocating a first function to the specific operation member in the case in which the optical finder means is used and allocating a second function to the specific operation member in the case in which the electronic finder means is used, wherein
the first function is a function which is not used in the case in which the electronic finder means is used, and the second function is a function which is not used in the case in which the optical finder means is used,
the first function is a function used to adjust, by using the aperture adjustment means, the size of the aperture to a size set in the main shooting process, and
the second function is a function used to adjust, by using the brightness adjustment means, the display screen brightness in response to ambient light around the display screen.

2. The image pickup apparatus according to claim 1, wherein the specific operation member is provided within a range that a predetermined finger of a right hand that holds the image pickup apparatus can reach.

3. The image pickup apparatus according to claim 2, wherein the specific operation member is provided at a lower portion of the front side of the image pickup apparatus.

4. The image pickup apparatus according to claim 1, wherein the first function is used to change the light image of the subject into a subject light image to be received by the image pickup means in the main shooting process and guide the subject light image to the finder window.

5. An image pickup apparatus including a specific operation member for accepting an operation input, the image pickup apparatus comprising:
a shooting optical system including an aperture;
an aperture driving control unit configured to adjust a size of the aperture;
an image pickup unit configured to receive a light image of a subject through the aperture and generate an image signal;
a display unit configured to display an image on the basis of the image signal;
a brightness adjustment unit configured to adjust a display screen brightness of the display unit;
an electronic finder unit configured to cause the display unit to display the image relating to the light image of the subject before performance of a main shooting process on the basis of image signals generated in sequence by the image pickup unit;

an optical finder unit configured to guide the light image of the subject to a finder window; and an allocation unit configured to allocate a function of the image pickup apparatus to the specific operation member, wherein one of the electronic finder unit and the optical finder unit can be selectively used, and the allocation unit includes an allocation control section configured to allocate a first function to the specific operation member in the case in which the optical finder unit is used and allocate a second function to the specific operation member in the case in which the electronic finder unit is used, wherein the first function is a function which is not used in the case in which the electronic finder unit is used, and the second function is a function which is not used in the case in which the optical finder unit is used, the first function is a function used to adjust, by using the aperture driving control unit, the size of the aperture to a size set in the main shooting process, and the second function is a function used to adjust, by using the brightness adjustment unit, the display screen brightness in response to ambient light around the display screen.

6. The image pickup apparatus according to claim 5, wherein the specific operation member is provided within a range that a predetermined finger of a right hand that holds the image pickup apparatus can reach.

7. The image pickup apparatus according to claim 6, wherein the specific operation member is provided at a lower portion of the front side of the image pickup apparatus.

8. The image pickup apparatus according to claim 5, wherein the first function is used to change the light image of the subject into a subject light image to be received by the image pickup unit in the main shooting process and guide the subject light image to the finder window.

\* \* \* \* \*